Dec. 12, 1967  D. W. HAGELBARGER  3,357,113
DEVICE FOR TEACHING COMPUTER OPERATION AND PROGRAMMING
Filed Aug. 24, 1965  7 Sheets-Sheet 1

INVENTOR
D. W. HAGELBARGER
BY
Lucian C. Canepa
ATTORNEY

Dec. 12, 1967     D. W. HAGELBARGER     3,357,113
DEVICE FOR TEACHING COMPUTER OPERATION AND PROGRAMMING
Filed Aug. 24, 1965     7 Sheets-Sheet 3

Dec. 12, 1967    D. W. HAGELBARGER    3,357,113
DEVICE FOR TEACHING COMPUTER OPERATION AND PROGRAMMING
Filed Aug. 24, 1965    7 Sheets-Sheet 6

Dec. 12, 1967         D. W. HAGELBARGER         3,357,113
DEVICE FOR TEACHING COMPUTER OPERATION AND PROGRAMMING
Filed Aug. 24, 1965
7 Sheets-Sheet 7

FIG. 11

| INPUT CARD NO. | NO. IMPRINTED ON CARD | |
|---|---|---|
| 1 (TOP CARD) | 002 | ⎫ |
| 2 | 800 | ⎪ |
| 3 | 006 | ⎪ |
| 4 | 803 | ⎪ |
| 5 | 005 | ⎪ BOOTSTRAP ROUTINE |
| 6 | 200 | ⎬ FOR LOADING REMAINDER |
| 7 | 004 | ⎪ PROGRAM INTO LOCATIONS |
| 8 | 603 | ⎪ OF MEMORY MEMBER 12 |
| 9 | 003 | ⎪ |
| 10 | 102 | ⎪ |
| 11 | 002 | ⎪ |
| 12 | 002 | ⎭ |
| 13 | 020 | ← SPECIFIES LOCATION OF CONTENTS OF FIRST CARD TO FOLLOW |
| 14 | 030 | ⎫ |
| 15 | 031 | ⎪ |
| 16 | 130 | ⎪ |
| 17 | 731 | ⎪ |
| 18 | 632 | ⎬ ACTUAL REMAINDER PROGRAM |
| 19 | 731 | ⎪ |
| 20 | 328 | ⎪ |
| 21 | 824 | ⎪ |
| 22 | 532 | ⎭ |
| 23 | 900 | ← BLANK CARD-TO STOP LOADING ROUTINE |
| 24 |  | |
| 25 | 820 | ← TRANSFER TO REMAINDER PROGRAM (LOCATION 20) |
| 26 | 013 | ⎫ DATA |
| 27 (BOTTOM CARD) | 005 | ⎭ |

United States Patent Office 3,357,113
Patented Dec. 12, 1967

3,357,113
DEVICE FOR TEACHING COMPUTER OPERATION AND PROGRAMMING
David W. Hagelbarger, Morris Township, Morris County, N.J., assignor to Bell Telephone Laboratories, Incorporated, New York, N.Y., a corporation of New York
Filed Aug. 24, 1965, Ser. No. 482,227
20 Claims. (Cl. 35—13)

ABSTRACT OF THE DISCLOSURE

An educational aid for teaching the fundamentals of digital computer operation and programming is described. The aid includes a base portion with a simulated main memory thereon. A two-position control element is hingedly secured to the base in spaced relation to the memory. The control element includes a set of sliders settable, in its first position, to display one of the numbers stored in the memory and to display, in its second position, a decoded version of the number. An auxiliary memory and input and output instruction cards are also provided.

---

Figure 1:
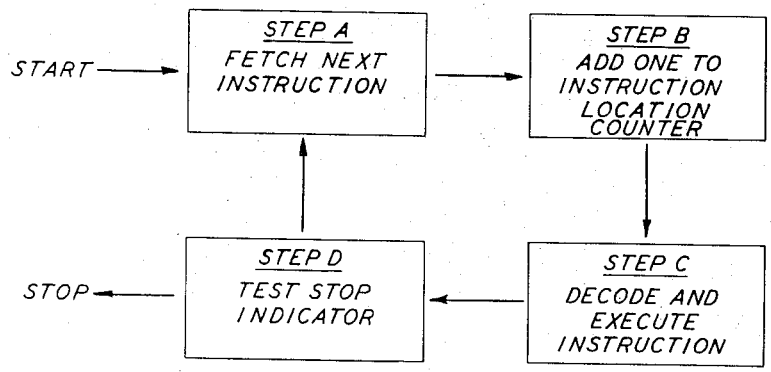

This invention relates to an educational device and more particularly to a device for teaching the fundamentals of digital computer operation and programming.

The complexities of modern commerce and technology have produced mathematical, scientific, engineering and business problems in great profusion. These problems have increased so rapidly in number and scope that man has turned increasingly to various mechanical and electronic devices for help in solving them. One of the most powerful and helpful of these devices is the general purpose stored program electronic computer which is characterized by the ability to solve problems rapidly and accurately.

A digital computer can be viewed as a machine that performs the basic operations that deal with problems from mathematics and related areas. If a problem of any kind can be stated in mathematical terms and can be considered to consist of a number of distinct operations, these operations can be performed by a computer. For computers to be able to solve such problems, the problem must first be translated into a form suitable for interpretation and solution by a computer. The process of analyzing a problem into its component parts and translating the parts into a form suitable for execution, that is, into a sequence of instructions, is commonly referred to as programming.

Programming a problem for solution on a digital computer is basically a process of translating from the language convenient to human beings to the language convenient to the computer. The language of the problem to be solved is mathematics or English statements of decisions to be made. The language of the computer is simple arithmetic and elementary choices, expressed in coded numerical form.

It is generally recognized that if a programmer is to appreciate fully the job of writing a program, he must understand how a computer is organized and how it is operated to perform computations. Thus, any device adapted to be utilized as an aid for teaching the elements of computer programming should also be arranged to demonstrate the fundamentals of computer organization and operation.

An object of the present invention is an improved educational device.

More specifically, an object of this invention is a device for teaching the fundamentals of digital computer operation and programming.

Another object of the present invention is an educational aid which is adapted to provide a step-by-step display indicative of how a general purpose stored program digital computer executes each instruction in a sequence of program instructions and also how each set of program instructions is carried out to cause a desired computer operation to be performed.

Still another object of this invention is an educational device having associated therewith a near-minimum set of instructions, whereby the essential operations of a general purpose stored program digital computer can be demonstrated in a straightforward and clear fashion.

Yet another object of the present invention is an educational device or instructional toy which is easily fabricated, relatively simple and fool-proof to operate, and which is reliable in performance.

These and other objects of the present invention are realized in a specific illustrative embodiment thereof that comprises a base portion having mounted thereon a magnetic blackboard or main memory member on which three-digit numbers may be written at any of 100 different address locations that are numbered from 00 through 99. A magnetic bug or instruction location counter is associated with the main memory and is movable to designate a selected one of the address locations. Each "number" in the memory may be considered to be a number or an instruction. If the stored number is treated as an instruction, the first or left-most digit thereof is considered to be the operation code portion of the instruction and the other two digits are construed as designative of an address location in the memory. For example, the instruction order 234 means "add the contents of address location 34 to a prescribed storage medium."

Associated with the main memory and also mounted on the base portion is a hinged sheet member or control element which can be moved into relatively close proximity to the memory or swung to a more remote position therefrom. In the first-mentioned position, one side of the control element and the main memory simulate the action of a computer during the instruction time of a complete computing cycle of operation. During this time an instruction is fetched or retrieved from the memory. To implement this fetching or reading operation, three sliders on the control element are set by the operator of the device to display the digits stored in the address location designated by the bug (instruction location coder). Then the bug is moved to the next higher-numbered address location, thereby to simulate the action of incrementing by one the indication of the instruction location counter.

Subsequently, the control element is swung away from the main memory, whereby the other side of the control element is then face-up. Execution of the retrieved instruction is then accomplished. This is actually carried out by movable cards whose positions relative to a reading window are determined by the positions of the three aforenoted sliders on the first-mentioned side of the control element. In this way, the instruction represented by the slider positions is decoded. Thus, for example, if the sliders display the number 234 on one side of the control element, the decoded version thereof ("add the contents of address location 34 to the prescribed storage medium")

is displayed on the other side of the control element during execution time.

The illustrative aid also includes an accumulator memory (a small blackboard) and an input-output area for holding cards by means of which information is applied to and abstracted from the apparatus.

Operation of the illustrative aid is accomplished by following a clear and exact sequence of steps specified by lines and orders that closely resemble the layout of a computer flow chart. At the end of a complete cycle of operation of the aid, the arrangement of the structural members thereof is always controlled by orders so as to be left in a standard starting configuration, ready for another cycle of operation.

It is thus a feature of the present invention that an educational aid adapted to teach the fundamentals of computer operation and programming include a magnetic blackboard having associated therewith a movable magnetic bug that simulates in a simple and visually-effective manner the action of an instruction location counter.

It is another feature of this invention that the aid include a control element movable into first and second registrations with respect to the magnetic blackboard, thereby to simulate the structure arrangement of a computer during the instruction and execution times, respectively, of a complete computing cycle of operation.

It is still another feature of the present invention that the aid include a first indicia device settable, when the control element is in its first registration, to represent and display the particular three-digit number stored at the address location designated by the magnetic bug.

It is yet another feature of this invention that the control element include a second indicia device for displaying, when the element is in its second registration, the address portion of the three-digit number displayed by the first indicia device and, in addition, a decoded version of the operation code portion of the number indicated by the first device.

It is a still further feature of the present invention that the base portion thereof include an input-output section and an accumulator memory.

Figure 6:
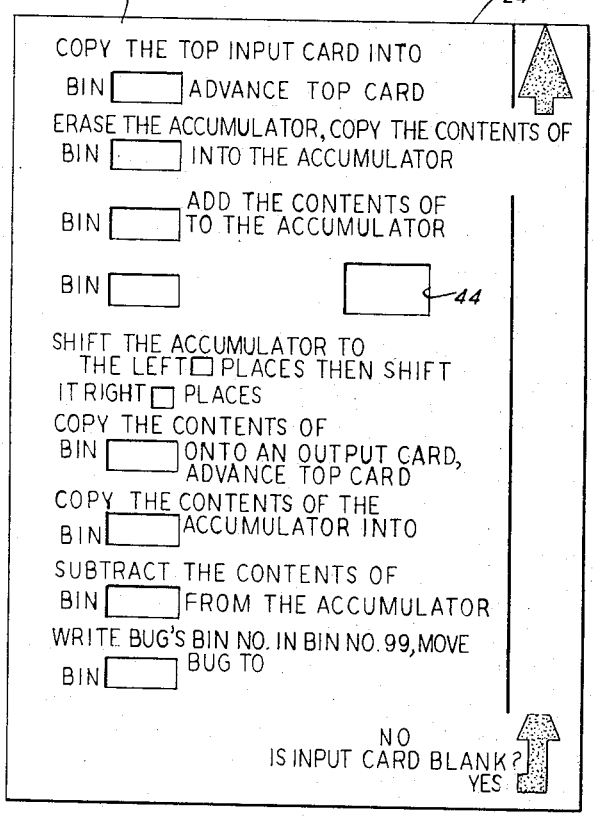
Figure 2:
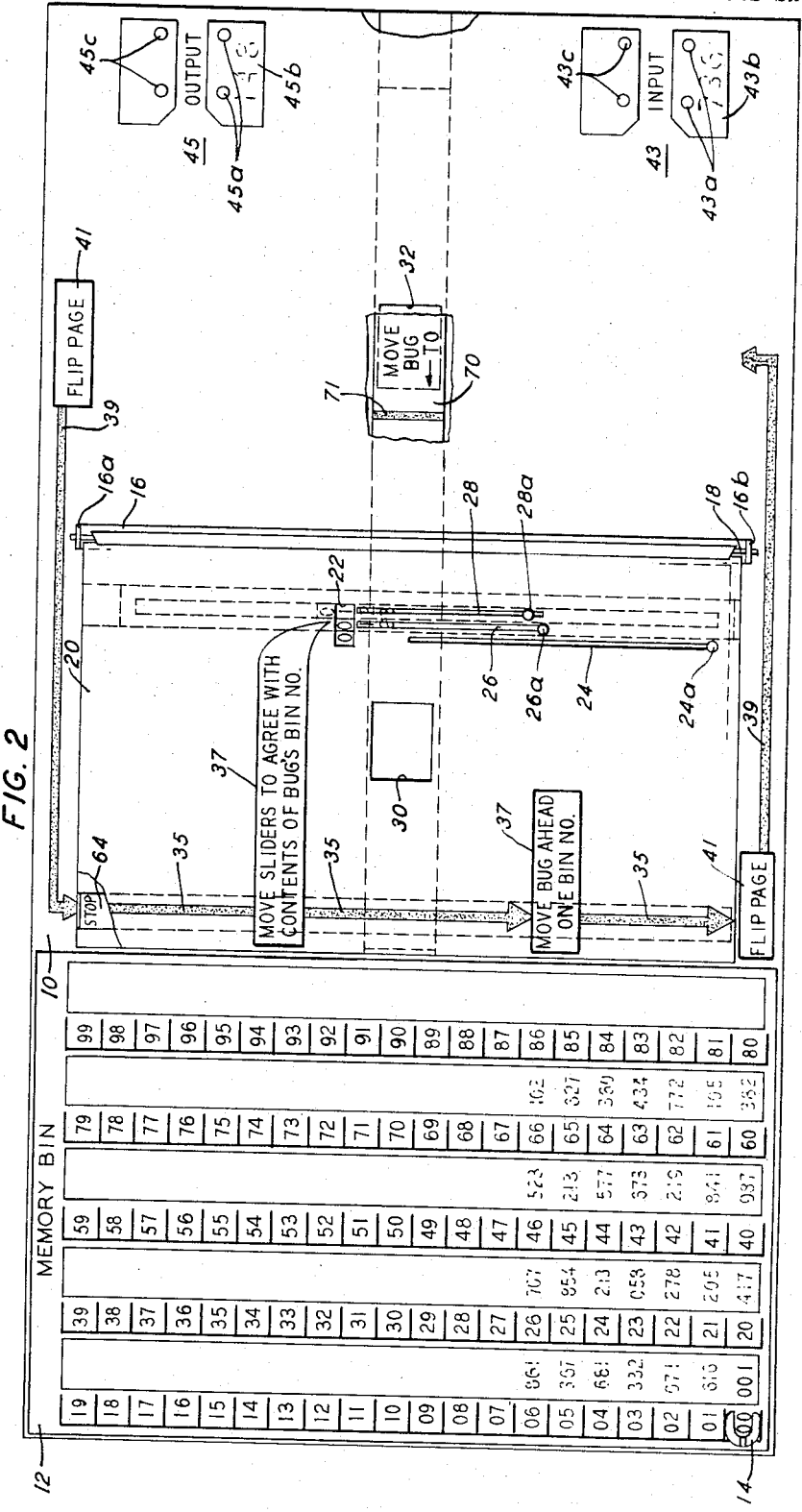
Figure 3:
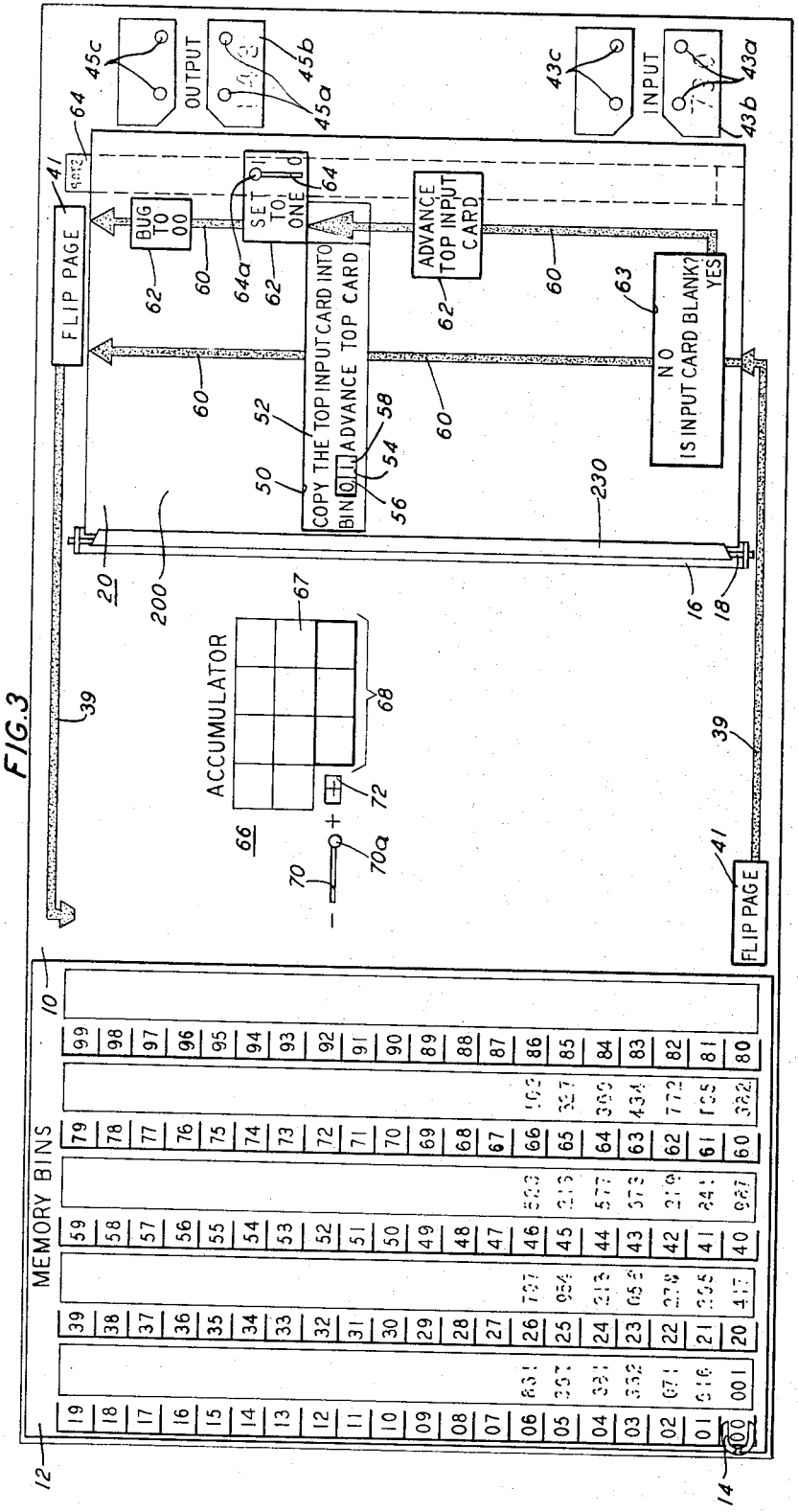
Figure 4:
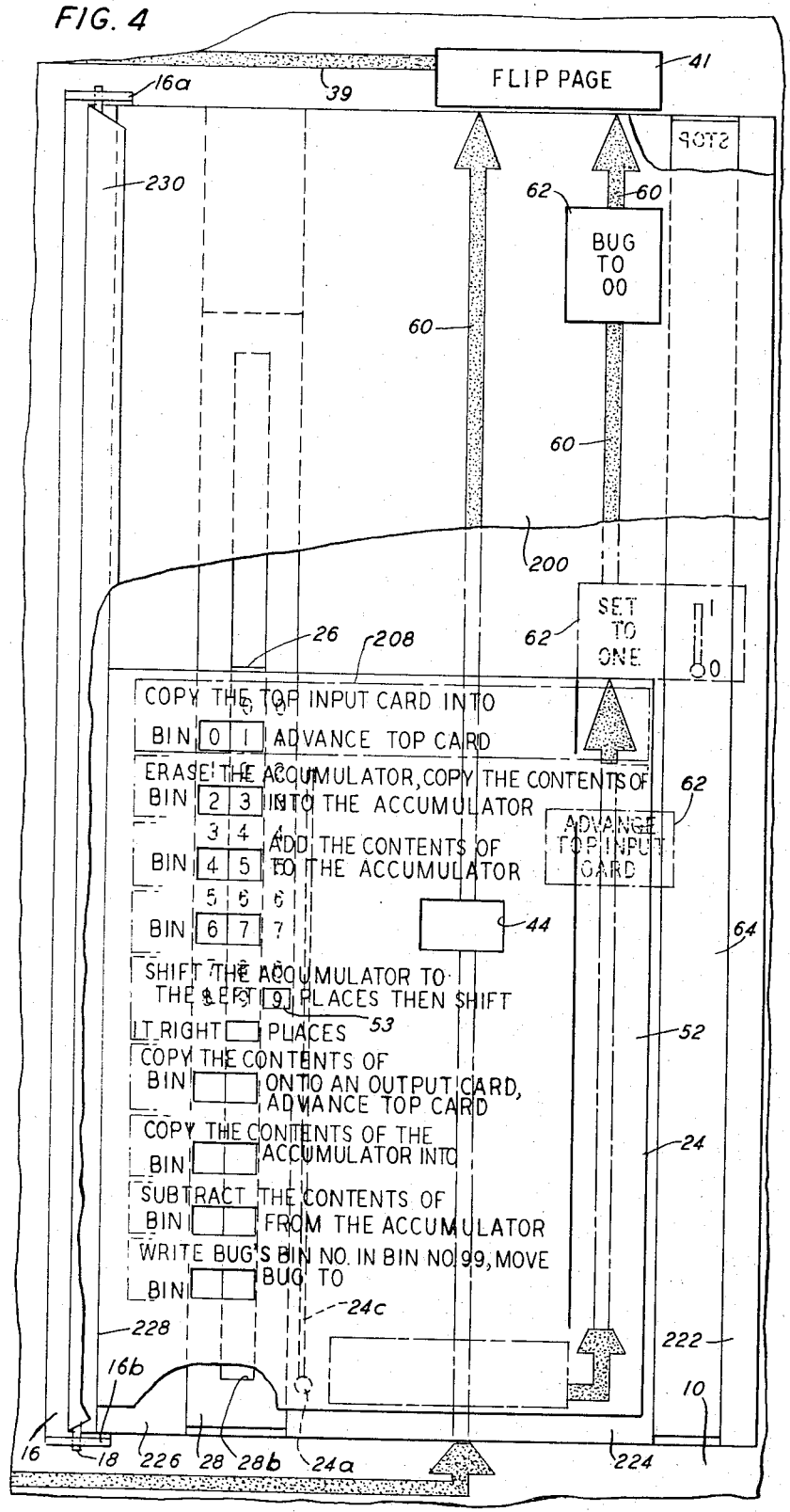
Figure 5:
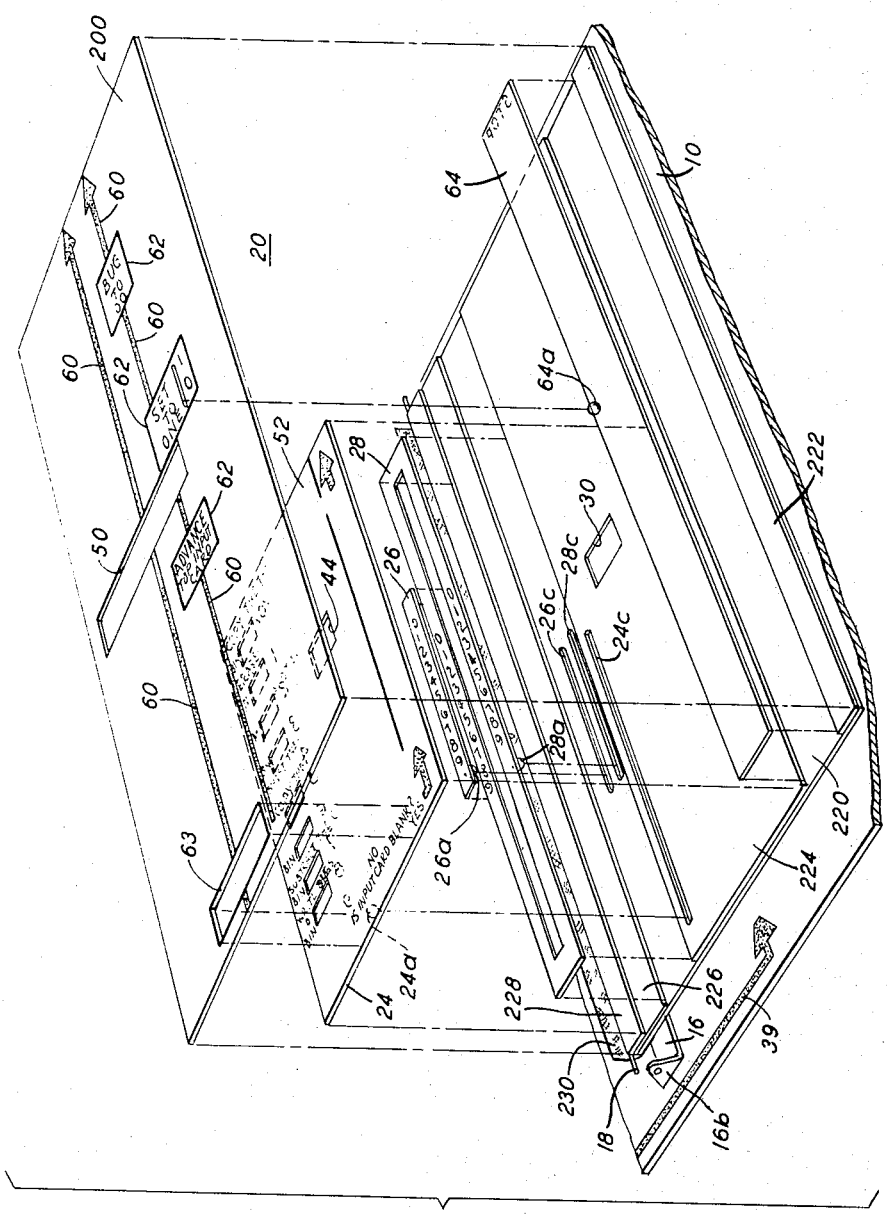

A complete understanding of the present invention and of the above and other features and advantages thereof may be gained from a consideration of the following detailed description of an illustrative embodiment thereof presented hereinbelow in connection with the accompanying drawing, in which:

FIG. 1 is a flow diagram representative of the overall mode of operation of an embodiment of the principles of the present invention;

FIGS. 2 and 3 each depict a specific illustrative educational device made in accordance with the invention and respectively show the structural arrangement thereof during the instruction and execution times of a complete cycle of operation;

FIGS. 4 and 5 show in detail the arrangement of a control element 20 included in the illustrative device;

FIG. 6 illustrates the layout of the decoding surface 52 of a slider mechanism 24 included in the device shown in FIGS. 2 and 3;

FIGS. 7 through 10 are views or snapshots of a memory member 12 of the illustrative device, showing the storage condition of the member 12 at different selected points in an exemplary cycle of operation of the device; and FIG. 11 is a listing of the contents of a set of input cards by means of which a specific illustrative program to be executed is loaded into the memory number 12.

Before proceeding to a detailed description of a specific illustrative embodiment of the present invention, it will be helpful to a more complete understanding of the arrangement, capabilities and mode of operation thereof to review briefly some basic computer principles.

A computing system is like a highly efficient but literal-minded clerk. It can work very rapidly but requires very careful step-by-step instructions. These instructions must define in complete detail just what the computer is to do under every conceivable combination of circumstances with data that is fed to the system. Such a series of instructions comprises a program. Stating the instructions in such a way that the computer can execute them one-by-one can be an extremely complex and laborious task—so complex that in the past the ordinary person has been effectively prevented from making direct use of computers.

The inputs to the computer comprise principally a sequence of instructions which specify precisely a procedure to be performed. As indicated above, these instructions are called the program. In addition, data on which the instructions are to operate is applied to the computer. Instructions and data may be read into the computer from various different sources such as, for example, from punched cards, from magnetic or paper tape, or they may be inserted manually from a typewriter-like keyboard.

The inputs to the computer, the instructions and the data, are stored internally in the computer in the memory unit. Hence the term "stored program." Actually the information stored by the memory unit can include original data, instructions, intermediate and final results of computations, and reference tables.

The memory unit of a typical general purpose computer comprises a large number of pigeon holes or storage cells, each of which can hold a single multidigit binary number. For purposes of identification the storage cells are numbered in sequence. By means of these numerical addresses the system can locate data and instructions as needed during the course of a computation. It's important to appreciate that just as the number on a safe deposit box tells absolutely nothing about the contents of the box, so, too, the numbers that identify the pigeon holes in memory have no relationship to the numbers actually stored in the cells.

When a number is stored in a memory cell it erases and replaces any number that was in that location previously. However, in retrieving a number from memory the computer simply copies it from its storage position. In other words, the memory is characterized by nondestructive readout.

Normally, during actual operation of a computing system, instructions are taken from sequentially-numbered storage cells. However, the execution of instructions does not have to take place in this manner. It is possible by using control or transfer instructions to alter the sequential execution process and to indicate some other location as containing the next instruction to be executed. In this way it is possible to repeat any instruction or block of instructions as often as desired. Also, the logical path followed by the program may be determined by a series of tests applied at various points in the execution process. In this way a stored program can be provided with the ability to control its own course of execution.

A storage cell in a typical computing system comprises elements such as magnetic cores which are capable of storing binary digits. Each such cell has an identifying number or address and can be used either to store an instruction to the computer ordering a particular operation or can be used to store the operand of an operation. A typical computer instruction includes an operation code part and an address location part. The operation code part represents a specific computer operation, whereas the address part denotes the location in main memory which is to be subjected to some arithmetic or logical operation.

A general purpose digital computer can perform two classes of mathematical operations. First, it can do ordinary arithmetic consisting of addition, subtraction, division and multiplication. Second, it can test numbers to determine whether they are negative, zero or positive. Addition, subtraction, multiplication and division are called, quite naturally enough, arithmetic operations. Testing a number to see if it is negative, zero or positive is known as a decision or logical operation. Both arithmetic and decision operations are carried out by the arithmetic and control unit of the computer.

Out of these simple arithmetic and decision operations, step-by-step procedures can be constructed to accomplish any type of numerical calculation whatsoever. To a large extent programming is a matter of figuring out how to generate more complex computational sequences from combinations of these fundamental mathematical operations.

To help fix our conceptual thinking, let's take a rudimentary problem through the computational process. Suppose we want to multiply two numbers together. Although mathematically trivial, this problem nevertheless involves all four basic computational operations: input, storage in memory, mathematical calculation, and output.

Both the program and the data to be operated upon are put into the computer in the form of numbers. For example, two sets or decks of punched cards are needed. The one containing the instructions comprises the program. The other deck contains the numbers to be processed in accordance with the instructions in the program.

First, the program is read into memory by equipment which includes card readers that translate the presence or absence of punches into electrical signals. The instructions comprising the program are stored in a block of pigeon holes or cells, one after the other. Then the computing system is told by a special control card to actually execute the instructions one by one. To find its first instruction the arithmetic and control unit looks in the first cell in the block of storage set aside for the program. It executes this instruction and then, unless the first instruction says otherwise, the computer looks in the next pigeon hole for its second instruction, and so on. In other words, the normal flow of control is from one instruction to the next in sequence. However, it often happens that an instruction will tell the arithmetic and control unit not to go to the next instruction in the normal flow of control but rather to look elsewhere. The ability of the program to vary the flow of control in this way is one of the most powerful and useful features of a modern-day computer. In any case, regardless of whether the instructions are carried out in the same sequence in which they were written, the process is eventually terminated by an instruction that tells the computer to stop.

Note that an instruction to read the two numbers into memory must be included in the multiplication program just as are instructions to multiply the numbers and print the product. In order to multiply the two numbers the computer first reads and stores them in separate cells in memory. Next, one of the numbers is copied out of memory and into a special cell or register in the arithmetic and control unit. Then the second number is copied out of its storage cell and multiplied by the contents of the special register. The product is then put into another pigeon hole in the arithmetic and control unit known as the accumulator register. The answer is then copied out of the accumulator and placed in an unused storage cell in memory. Finally, the product is copied from its pigeon hole in memory and, for example, printed on paper.

To understand better what goes on inside a computer during actual operation thereof, let's consider briefly the topic of machine cycles. Within a so-called machine cycle the computer can perform a specified machine operation. In the process of receiving, interpreting and executing instructions, the control unit of the computer operates in a prescribed sequence. The first machine cycle required to execute an instruction is called an "instruction cycle."

At the beginning of the instruction cycle, an instruction location counter is set to the address of the first program instruction. Let's say that this first address is 43. The instruction located in cell 43 is taken from main memory and brought to the control unit. Then the operation part of the instruction word is decoded. This tells the machine what is to be done, for example the operation of addition. Then the operand is placed in an address register. This tells the computer what it is to work with.

Meanwhile the instruction location counter automatically steps or advances to the address of the cell in main memory in which the next instruction is stored. By the time one instruction is executed the counter has located the next instruction in the program sequence. The stepping action of the instruction counter is automatic. When the computer is directed to a series of instructions, it will execute them one after the other unless instructed to do otherwise.

As indicated, execution of instructions does not necessarily have to proceed sequentially. Certain instructions alter the process of sequential execution unconditionally. In this case, an instruction brought from storage indicates that the next sequential instruction is not to be executed but that one located in another position is next; the normal stepping of the instruction location counter is altered accordingly. For instance, the instruction location counter can be reset back to the beginning of the program so that the entire program can be repeated for another incoming group of data.

This branching or transfer to alternative instructions may also be conditional. The computer can be directed to examine some indicating device and then branch if the indicator is on or off. Such an instruction says, in effect, "Look at the sign of the quantity in the accumulator; if this sign is minus, take the next instruction from, say, location 50; if the sign is positive, proceed to the next instruction in sequence." The instruction counter is then set according to one of the *two* possible storage locations (50, or the location of the next instruction in sequence). The logical path followed by the computer (that is, the precise sequence of instructions executed) may be controlled either by unconditional branching or by a series of conditional tests applied at various points.

Instruction time is usually followed by one or more machine cycles which occur during execution time. The execution cycle starts by removing from storage the information located at a specified address, for example location 14, indicated by the address register. This information is placed in a storage register and then, for example, applied to adders wherein it is combined with the number stored in an accumulator register. The sum is then returned to the accumulator register.

The overall mode of operation of the specific illustrative educational device to be described in detail hereinbelow is represented in FIG. 1. This operation closely resembles that described above as being typical of a general purpose stored program computer. Each operating cycle of the illustrative device commences by fetching or retrieving from the main memory thereof the instruction stored at the address location specified by the magnetic bug or instruction location counter. Next, the bug is moved ahead by one address location, thereby to simulate the action of incrementing by one the indication stored in the instruction location counter. Then the retrieved instruction is decoded and executed. Next in sequence, a STOP switch is in effect tested to ascertain whether the computing operation should terminate or whether another complete cycle of operation should be initiated.

Referring now to FIG. 2, there is shown a specific illustrative embodiment of the principles of the present invention. The embodiment includes a base portion 10 having mounted thereon a main memory member 12 which comprises 100 different address locations or cells numbered from 00 through 99. Each location is adapted to store a signed three-digit number. Any three-digit number stored in the memory 12 can be read out therefrom by reference to its corresponding two-digit address or memory bin location number.

Associated with the memory 12 is a bug or instruction location counter 14 which is movable to designate any selected one of the 100 depicted bins or cells. In the position shown in FIG. 2 the bug 14 designates address location or bin No. 00 whose contents are indicated in FIG. 2 as being the three-digit number 001. Illustratively, the bug 14 is a permanent magnet member and the memory 12 is a sheet formed of a magnetic material sprayed with a conventional blackboard paint and having the bin numbers or address locations 00 through 99 permanently printed thereon. Thus, the bug 14 may be easily moved into stable, attractive contact with any selected one of the depicted address locations. Numbers to be stored are entered in the various memory bins by means of any suitable chalk writing implement (not shown).

Secured to the base portion 10 of the embodiment shown in FIG. 2 is a cradle member 16 including two apertured portions 16a and 16b disposed perpendicular to the base 10. Extending through the apertures in the portions 16a and 16b is a rod 18 which is fixedly secured to a sheet member or control element 20. The rod 18 is disposed with respect to the portions 16a and 16b for easy rotation therein, whereby the control element 20 may be positioned as shown in FIG. 2 or swung by hand to the position depicted in FIG. 3.

The control element 20 shown in FIG. 2 includes a window or viewing area 22 in which may be displayed any three-digit number. Selection of a particular number to be displayed in the window 22 is controlled by vertical movement of three slider mechanisms 24, 26 and 28 which include respective knobs 24a, 26a and 28a. Each of the slider mechanisms 24, 26 and 28 has imprinted thereon in vertical alignment the digits 0 through 9. Hence, selective movement of the knobs 24a, 26a and 28a is effective to register any number from 000 through 999 in the window 22. For illustrative purposes, the sliders 24, 26 and 28 are shown in FIG. 2 in the positions in which the number 001 stored in bin No. 00 is displayed in the window 22.

The left-most digit displayed in the window 22 of FIG. 2 is imprinted on the slider mechanism 24, whereas the middle and right-most digits displayed there are imprinted on the mechanisms 26 and 28, respectively. It is noted that the window 22 represents in effect the instruction register of a conventional computer organization.

The control element 20 shown in FIG. 2 also comprises a cut-out area 30 through which, when the slider mechanism 24 is adjusted to display the number 3 in the window 22, can be seen a limited portion of the underlying base 10. The area 30 is so positioned in the element 20 that when the element 20 is swung to the right (to the position indicated in FIG. 3) the area 30 is then in exact overlying registry with a window 32 cut out of the base 10. The purpose and significance of the area 30 and the window 32 will become evident hereinbelow when typical cycles of operation of the illustrative device are described in detail.

Additionally, the control element or hinged sheet member 20 of FIG. 2 includes thereon printed flow lines 35 and orders or instructions 37 to guide an operator of the depicted device in the proper functioning thereof.

The base portion 10 of the device shown in FIG. 2 includes printed flow lines 39 and orders 41 which in conjunction with the aforementioned lines 35 and orders 37 on the element 20 control the progression and nature of the steps involved in operating the herein-described educational device.

Also included on the base portion 10 (FIG. 2) is an input area 43 and an output area 45. Each of these areas includes two pairs of pins for holding apertured cards. Thus, the input area 43 includes two pins 43a for holding input cards 43b each of which is either blank or contains a three-digit input number. During actual operation of the illustrative device, the input cards 43b are advanced or placed face down on the upper pair of input pins 43c. This advancement of the input cards 43b is performed by the operator of the device in response to printed orders.

The output area 45 indicated in FIG. 2 includes two lower pins 45a for holding a supply of blank cards 45b on which are printed (by the operator) output information specified by the device during operation thereof. Additionally, in response to advance orders, the operator is instructed from time to time to move the top output card from engagement with the pins 45a into a face-down position in registry with the top pair of pins 45c.

As mentioned above, the control element 20 may be positioned in either one of two registrations, indicated in FIGS. 2 and 3, respectively. The registration represented in FIG. 2 simulates the action of a computer during the instruction time of its cycle of operation, whereas the FIG. 3 arrangement simulates computer operation during the execution time thereof. Following the description immediately below of FIG. 3 there will be described in detail several exemplary cycles of operation of the illustrative device. By tracing through such cycles the two-part instruction-execution mode of operation of the depicted device will be made more apparent.

In FIG. 3 the control element 20 is shown in its swung-away position from the main memory 12, thereby to reveal the details of the other side of the element 20 and of that part of the base portion 10 which is covered in FIG. 2 by the element 20.

The face-up side of the control element 20 of FIG. 3 includes a relatively large window 50 through which are displayed words imprinted on a surface 52. The surface 52 comprises the reverse side of the slider mechanism 24 shown in FIG. 2 and described above. The imprints on the surface 52 are positioned thereon so as to constitute decoded (into ordinary English) versions of the operation code portions or left-most digits of any three-digit instruction words displayed in the window 22 of FIG. 2. Thus, for example, for the particular case wherein the word 001 is displayed in the window 22 (see FIG. 2), the decoded version of the left-hand "0" digit is seen in FIG. 3 to be COPY THE TOP INPUT CARD INTO BIN. ADVANCE TOP CARD.

The surface 52 of FIG. 3 is itself apertured or windowed to display numbers imprinted on the reverse sides of the slider mechanisms 26 and 28 shown in FIG. 2. In this way, the two-digit address location portions of numbers appearing in the window 22 of FIG. 2 are displayed in the viewing area 50 on the reverse side of the element 20, as indicated in FIG. 3. For example, it is seen that the illustrative address location 01 shown in FIG. 2 appears within a window 54 in the aforementioned surface 52. The "0" digit appearing within the window 54 is imprinted on the reverse side 56 of the slider mechanism 26, whereas the "1" digit appearing therein is on the reverse side 58 of the slider mechanism 28. Hence, the full decoded version of the three-digit instruction word 001 is seen from FIG. 3 to be COPY THE TOP INPUT CARD INTO BIN 01. ADVANCE TOP CARD. In response to this instruction, the operator of the device would write the number appearing on the top one of the input cards 43b into the memory area adjacent bin No. 01. In further compliance with this instruction, the operator would then advance the top input card by turning it face down in registry with the pins 43c.

The side of the control element 20 shown in FIG. 3 also includes thereon flow-lines 60 and orders 62 which aid in controlling the sequence of operation of the illustrative device. Associated with the depicted order SET TO ONE is a slider mechanism 64 having affixed thereto a knob 64a which is designed to be either in the position shown adjacent the imprint "1" or in a down position adjacent the digit "0". Whenever the mechanism 64 is set to its "1" position, the word STOP is displayed at the top of the reverse surface of the mechanism 64, as indicated in FIG. 3 by dashed letters. On the other hand, whenever the mechanism 64 is set to its "0" position, the word STOP is not displayed above the top edge of the element 20.

In the FIG. 2 arrangement it is assumed that the mechanism 64 is in its "0" condition. Hence the word STOP thereon is recessed within the control element 20 and is not visible to an operator of the device. In FIG. 2 a broken-away section of the element 20 clearly shows the position of the mechanism 64 for the assumed condition.

As shown in FIG. 3, the portion of the base 10 that is intermediate the memory member 12 and the control element 20 includes an accumulator section 66. Illustratively, the section 66 comprises a blackboard 67 the bottom three squares of which constitute an accumulator register 68 for storing a single three-digit number. The upper eight squares of the blackboard 67 comprise a scratch-pad area on which operations such as addition and subtraction can be performed to derive results for storage in the register 68.

The three-digit number stored in the accumulator register 68 of FIG. 3 may be positive or negative. If the stored number is positive, the knob 70a of a slider mechanism 70 is positioned as shown, thereby a + sign appears in a window 72 in the base 10 immediately to the left of the register 68. On the other hand, if the number stored in the register 68 is negative, the knob 70a is moved by the operator to its extreme left-hand position, whereby a — sign (not shown in FIG. 3) that is imprinted on the slider mechanism 70 then appears in the window 72.

The side of the control element shown in FIG. 3 also includes a viewing area or window 63. When the digit "0" is established in the left-most position of the window 22 on the other side of the element 20, the notation illustrated in FIG. 3 is displayed in the window 63. If any other operation code digit is established in the window 22, a flow-line section appears in the window 63 to carry the operator's path of progression from the lower horizontal flow line 39 to the lower left-hand flow line 60 on the element 20.

A portion of the slider mechanism 70 is shown in FIG. 2. Whenever the knob 70a is in the position shown in FIG. 3, a vertical flow-line segment 71 imprinted on the mechanism 70 appears in the window 32. However, whenever the knob 70a is moved to indicate a negative number stored in the accumulator register 68, the words MOVE BUG TO imprinted on the slider mechanism 70 appear in the window 32. (In FIG. 2 the knob 70a is assumed to be in its left-most position, indicative of a negative number.) The significance of the order MOVE BUG TO will be apparent later.

One specific illustrative embodiment of the control element 20 is represented in detail in FIGS. 4 and 5. Referring first to FIG. 4, there is shown a top view of one side of the element 20 with portions broken away to permit easier identification of some of the component parts thereof.

The arrangement shown in FIG. 4 includes a top sheet 200 on which are imprinted the aforedescribed flow lines 60 and orders 62. Below the sheet 200 is the slider mechanism 24. Movement of the mechanism 24 causes different ones of the imprints on the surface 52 thereof to be visible through the window 50 (FIG. 3) whose position is represented in FIG. 4 by the rectangle 208.

Also shown in FIG. 4 is the slider mechanism 28 which is seen to be a rectangular member having a central slot 28b in which the mechanism 26 is adapted to slide. Imprinted on the left leg of the mechanism 28 are the digits 0 through 9 which comprise the left-hand or more significant digits of the address locations displayed in the window 50 of FIG. 3. In addition, the digits 0 through 9 are imprinted on the right leg of the mechanism 28. These second-mentioned digits are displaced slightly upward from the digits on the left leg of the mechanism 28 and constitute the digits which appear in a viewing window 53 in the surface 52 when the SHIFT code digit (specified later below) is displayed in the window 22 on the reverse side of the control element 20.

The digits 0 through 9 appear in aligned registry on each side of the slider mechanism 26. Thus, whichever digit is displayed by the mechanism 26 in the window 22 (FIG. 2) is also displayed in the window 50 (FIG. 3) as the right-hand or less significant digit of a prescribed address location.

An exploded view of the control element 20 is shown in FIG. 5 and is helpful to a better understanding of the assembly of the element 20. The upper-most member in FIG. 5 is the top sheet 200. Directly beneath the sheet 200 is the slider mechanism 24 whose knob 24a on the lower surface thereof is indicated in FIG. 5 in dashed outline.

The assembly shown in FIG. 5 includes a bottom-most sheet member 220 having secured thereto guide elements 222, 224, 226 and 228. The elements 222 and 224 are positioned to form therebetween a channel for guiding the aforementioned slider mechanism 64. Similarly, the elements 224 and 226 form a channel for guiding the slider mechanism 28. In turn, the slot in the mechanism 28 acts as a guide for the slider mechanism 26.

The sheet member 220 and the guide element 224 depicted in FIG. 5 are slotted to permit extension therethrough of the knobs 24a, 26a and 28a. The respective slots therefor are designated 24c, 26c and 28c. Additionally, the member 220 and the element 224 are apertured to form the window 30 which is also shown in FIG. 2.

In actual operation, the left edge of the slider mechanism 24 shown in FIG. 5 bears against the side of the guide element 228. Additionally, the mechanism 24 is maintained in alignment within the depicted array by the guiding action of its knob 24a in extending through the slot 24c.

Illustratively, the assembly of FIG. 5 is held together by a strip of adhesive tape 230 (which is adapted to be folded over the top of the sheet 200) and by a suitable adhesive applied to the top surface of the guide element 222. When the control element 20 is assembled, the slider mechanisms 24, 26, 28 and 64 are maintained therein in alignment and are easily moved by their respective knobs between their associated guiding elements.

The operational capabilities of the specific illustrative device shown in FIGS. 2 and 3 can be best understood by following through in detail several typical operating cycles thereof. However, before doing this, let us consider the various operation codes which are embodied in the herein-described device.

As indicated above, the left-most digit of each three-digit decimal number stored in the window or instruction register 22 of FIG. 2 is the operation code portion of the displayed number. Hence, ten different operation codes can be respectively represented by the digits 0 through 9. Assume that each such instruction word is of the form XYZ, where X is the operation code digit and YZ comprises a two-digit address location in the memory 12. Then, the ten possible operation codes can be defined as follows:

A.                          $X=0$

This is the INPUT code. If the face-up input card on the pins 43a is not blank, the left-hand flow-line 60 of FIG. 3 leads us to the window 50. The decoded version of 0YZ displayed in the window 50 is:

COPY THE TOP INPUT CARD INTO BIN YZ. ADVANCE TOP CARD.

In other words, this order directs the operator to copy the three-digit input number contained on the top input card into the area adjacent address location YZ, erasing any number previously stored in YZ. The operator is then directed to advance the top card of the input stack.

If the face-up input card on the pins 43a is blank, the right-hand flow-line 60 of FIG. 3 leads us to the SET TO ONE order 62. Movement of the knob 64a to its "1" position causes the STOP indication to extend above the top edge of the control element 20. Then the next order (BUG TO 00) directs the operator to move the bug or instruction location counter 14 to address location 00 of the memory 12.

B. $X=1$

This is the CLEAR AND ADD code. If the word 1YZ is established in the window 22 of FIG. 2, the decoded version thereof displayed in the window 50 of FIG. 3 is:

ERASE THE ACCUMULATOR. COPY THE CONTENTS OF BIN YZ INTO THE ACCUMULATOR.

In other words, this order directs the operator to erase the representation in the accumulator register 68 and to write therein the three-digit number stored at address location YZ.

C. $X=2$

This is the ADD code. If the word 2YZ is set up in the window 22, the decoded version thereof appearing in the window 50 is:

ADD THE CONTENTS OF BIN YZ TO THE ACCUMULATOR.

In other words, this order is to add the three-digit number stored at address location YZ to the three-digit number already stored in the accumulator register 68.

D. $X=3$

This is the BRANCH code. If the number stored in the accumulator register 68 is 000 or positive, and if the word 3YZ is displayed in the window 22 of FIG. 2, the surface 52 (FIG. 3) is so positioned in the window 50 that a cut-out portion 44 (shown in FIG. 4) of the surface 52 registers with the windows 30 and 32 of FIG. 2. This allows the aforementioned vertical flow-line segment on the slider mechanism 70 to mate with the upper and lower left-hand flow-lines 60 shown in FIG. 3. As a result, the operator of the device is guided straight through the window area 50 to the top of the control element 20.

On the other hand, if the number stored in the accumulator register 68 is negative, and if the word 3YZ is displayed in the window 22 of FIG. 2, the noted cut-out portion 44 of the surface 52 allows the words MOVE BUG TO on the slider mechanism 70 to appear in the window 50. At the same time, the notation BIN YZ appears in the window 50. Accordingly, the operator is instructed to move the bug 14 to address location YZ.

E. $X=4$

This is the SHIFT code. If the number 4YZ is set up in the window 22, the following decoded version thereof appears in the viewing area 50:

SHIFT THE ACCUMULATOR TO THE LEFT Y PLACES. THEN SHIFT IT RIGHT Z PLACES.

In carrying out prescribed shift operations, digits that are shifted out of the accumulator register 68 are lost. If the register 68 originally contains the three-digit number *abc*, the following table shows the contents thereof after various illustrative shift operations:

| Instruction: | Final contents of Accumulator Register 68 |
|---|---|
| 400 | *abc* |
| 401 | 0*ab* |
| 410 | *bc*0 |
| 402 | 00*a* |
| 422 | 00*c* |
| 412 | 00*b* |
| 403 | 000 |

F. $X=5$

This is the OUTPUT code. The decoded version of the instruction 5YZ is:

COPY THE CONTENTS OF BIN YZ ONTO AN OUTPUT CARD.
ADVANCE TOP CARD.

In response to this instruction, the operator of the device is ordered to copy the three-digit number stored at address location YZ onto the top one of the output cards 45b and then to advance this card by placing it face-down in registry with the pins 45c.

G. $X=6$

This is the STORE code. The instruction 6YZ is decoded by the device as follows:

COPY THE CONTENTS OF THE ACCUMULATOR INTO BIN YZ.

In other words, this instruction orders the operator to copy the three-digit number stored in the accumulator register 68 into the storage area adjacent address location YZ, erasing or overwriting any number previously stored at YZ. In performing this operation, the contents of the register 68 is not erased or destroyed.

H. $X=7$

This is the SUBTRACT code. Its decoded version is:

SUBTRACT THE CONTENTS OF BIN YZ FROM THE ACCUMULATOR.

In other words, this instruction specifies that the three-digit number stored at address location YZ be read out therefrom (non-destructively) and substracted from the contents of the accumulator register 68, the result being stored in the register 68.

I. $X=8$

This is the JUMP code. The instruction 8YZ is decoded to:

WRITE BUG'S BIN NO. IN BIN NO 99.
MOVE BUG TO BIN YZ.

In response to this instruction, the operator would write into address location 99 the address location number at which the bug 14 is positioned. Then the bug 14 would be moved to address location or bin No. YZ. (Illustratively, the digit 8 is permanently written into the left-most or operation code digit position of the area adjacent address location 99.)

J. $X=9$

This is the HALT code. In response to establishing the instruction 9YZ in the window 22, the operator is lead by a flow line displayed in the viewing area 50 to the order SET TO ONE. Setting of the knob 64a to its "1" position causes the slider mechanism 64 to move upwards, thereby displaying the word STOP above the top edge of the control element 20 when the device is arranged in the instruction mode (FIG. 2). Further progress upwards along the right-hand flow line 60 of FIG. 3 leads to the order BUG TO 00 which instructs the operator to move the bug 14 to address location 00. Thus, when the element 20 is flipped from the position shown in FIG. 3 to that shown in FIG. 2 (in response to the order FLIP PAGE), the word STOP is displayed and the bug 14 is positioned at location 00, which are the initial starting conditions assumed above.

FIG. 6 shows the entire surface 52 of that side of the slider mechanism 24 that is displayed through the window 50 in the control element 20. FIG. 6 is in effect a summary of the operation codes defined above. The decoded versions of the operation code numerals 0 through 9 appear in top-to-bottom order on the surface 52.

A detailed account of the mode of operation of the illustrative device shown in FIGS. 2 and 3 will now be given. Assume that the storage condition of the memory member 12 shown in FIGS. 2 and 3 is as represented in FIG. 7. (The specific procedure by which the member 12 is so conditioned will be described later hereinbelow.) Initially, the control element 20 is oriented in the registration shown in FIG. 2. From a previous cycle of operation, the bug 14 is positioned at address location 00. In addition, the slider mechanism 64 is in its raised position, whereby the notation STOP is visible above the top edge of the element 20. Furthermore, assume that the pins 43a in the input section 43 hold three cards with the numbers 820, 013 and 005, respectively, imprinted thereon. (Illustratively, unsigned numbers are assumed to be positive.)

The illustrative sequence of instructions to be described is a so-called remainder program. It will cause two positive numbers (the first larger than the second) to be read into the memory member 12. Subsequently, the program causes the first number to be divided by the second (by a process of successive subtractions). The remainder of this division operation (actually only the numerator of the remainder fraction) is then printed out on an output card. Thus, for example, if the positive number 13 is divided by the positive number 5, the remainder to be printed out is the positive number 3.

To start a cycle of operation, the operator of the illustrative device pushes the slider mechanism 64 (FIG. 2) downwards, thereby simulating the initiating action required of a computer console attendant. The operator then follows the upper-most flow line section 35 to the upper order box 37. In response to the order contained in this box, the operator manipulates the slider mechanisms 24, 26 and 28 to establish the number 001 (as shown in FIG. 2) in the window or instruction counter 22. Then the middle flow line section 35 is followed to the lower order box 37 which instructs the operator to move the bug 14 ahead by one bin number (to address location 01). The bottom-most flow line section 35 is then followed to the order FLIP PAGE which instructs the operator to move the control element 20 to the registration shown in FIG. 3.

Subsequently, the lower horizontal flow line 39 on the base 10 is followed to the window area 63. The notation displayed in the area 63 asks "IS INPUT CARD BLANK?". Since the top input card is not blank (we assumed above that it contains the number 820) the lower left-hand flow line 60 is followed to the window 50 which displays therein the decoded version of 001. This decoded instruction orders the operator to copy the contents of the top input card into address location 01 and to then advance the top input card into registry with the pins 43c. The resulting condition of the memory member 12 is shown in FIG. 8.

The upper left-hand flow line 60 of FIG. 3 is then followed to the order box 41 which instructs the operator to flip or swing the control element 20 back to the registration illustrated in FIG. 2. In accordance with the same step-by-step procedure described above, the slider mechanisms 24, 26 and 28 are then set to display the number 820 which is stored at the address location (01) designated by the bug 14 (see FIG. 8). The position of the bug 14 is then moved ahead one location to bin No. 02. Subsequently, the instruction 820 is decoded and displayed in the window 50 of FIG. 3. This decoded instruction orders the operator to write the bug's bin No. (i.e. 02) in bin No. 99 and to move the bug 14 to bin No. 20. The resulting condition of the memory member 12 is shown in FIG. 9.

In the same manner described above, the number 030 stored at address location 20 is then decoded. This causes the number imprinted on the second input card (i.e. the number 013) to be stored at address location 30. Then the next instruction in sequence (the one stored at address location 21) is decoded. This causes the number 005 on the third input card to be stored at address location 31. The resulting condition of the memory member 12 at this point in the overall cycle of operation is shown in FIG. 10.

Next, the instruction 130 stored at address location 22 (FIG. 10) is decoded. This instruction orders the operator to erase the accumulator register 68 and to copy therein the number stored at address location 30. This results in the positive number 013 being written into the register 68.

Then, the instruction 731 stored at address location 23 is decoded. (Although the bug 14 is shown in FIG. 10 as being positioned at location 22, it is to be understood that its position is selectively changed in an apparent manner as the next series of instructions is executed.) The instruction 731 orders the operator to subtract the contents of bin No. 31 (i.e. the stored number 005) from the number stored in the accumulator register 68. This subtraction can be carried out in the scratch-pad area of the accumulator section 66. The result of this operation (i.e. the positive number 008) is entered into the register 68 to replace the number 013 previously stored therein.

Next, the instruction 632 stored at address location 24 is decoded. This causes the contents of the accumulator register 68 to be nondestructively read out of the register 68 and stored in address location 032.

The next instruction is stored at address location 25 and is seen to be identical to the one stored at location 23. As noted before, this instruction orders the operator to subtract the number 005 from the number stored in the accumulator register 68. The result of this subtraction (i.e. the positive number 003) then replaces the number 008 previously stored in the register 68.

The BRANCH instruction 328 stored at address location 26 is then decoded. Since the number stored in the accumulator register 68 at this point is *positive*, the operating cycle of the device proceeds in effect to the decoding of the next instruction in sequence. This next instruction is 824 which orders the operator to write the present address location of the bug 14 (i.e. the location 27) into the area adjacent bin No. 99 and to move the bug 14 to address location 24. As a result of this looping-back, a series of instructions stored at locations starting with location 24 will be re-executed.

The instruction at location 24 causes the positive number 003 stored in the accumulator register 68 to be nondestructively read out of the register 68 and to over-write the number previously stored at location 32. Next, the instruction 731 is decoded, which causes the number 005 stored at address location 31 to be subtracted from the number 003 stored in the register 68. The result of this operation is a negative number (−002). To represent this negative number, the operator moves the slider mechanism 70 (FIG. 3) to the left, which causes a − sign to appear in the window 72 and the notation MOVE BUG TO to appear in the window 32 (FIG. 2).

Hence, when the instruction 328 stored at address location 26 is displayed in the window 22 of FIG. 2, the decoded version thereof seen in the window 50 of FIG. 3 orders the operator to move the bug 14 to address location 28.

Decoding of the number 532 stored at address location 28 orders the operator to copy the contents of bin No. 32 (i.e. the positive number 003) onto the top one of the stack 45b of output cards. The next instruction in sequence is 900, which causes the operator to be led to the order SET TO ONE shown in FIG. 3. As described above, setting of the slider mechanism 64 to its "1" position causes the notation STOP to be displayed above the top edge of the control element 20. In addition, the subsequent order BUG TO 00 causes the bug 14 to be returned or reset to the initial address location 00. The element 20 is then flipped to the registration represented in FIG. 2, and the described cycle of operation is terminated when the noted STOP indication is encountered by the operator.

Thus, as desrribed in detail above, a plurality of stored instructions in conjunction with three input cards have been shown to be effective to divide the number 005 into the number 013 and to print the remainder thereof (the positive number 003) onto an output card. At the conclusion of the described operation, the bug 14, the slider mechanism 64, and the control element 20 are so positioned as to be arranged for the commencement of another cycle of operation of the illustrative device.

In a similar manner, other programs may be devised to demonstrate the operation of the specific exemplary device shown in FIGS. 2 and 3. Devising such programs for the described device constitutes an effective way of learning the intricacies of programming. In addition, the decoding by the illustrative device of each instruction of such programs furnishes a clear and understandable exposition of the systematic manner in which a general purpose stored program computer executes a prescribed order. Also, the illustrative device demonstrates how each set of instructions is carried out in a coordinated fashion to cause a desired computer operation to be performed.

In operating the illustrative educational device shown in FIGS. 2 and 3 for the very first time, the operator thereof is instructed to write the number 001 at address location 00. In addition, the operator is ordered to position the control element 20 in the registration depicted in FIG. 2 and to commence operation of the device by depressing the slider mechanism 64. (If the indication STOP is visible.) If the indication STOP is not visible, the path of progression commences at the top of the uppermost flow line section 35. Additionally, a so-called bootstrap or input loading routine (printed on a stack of input cards) is necessary to place a program to be executed into the memory member 12. An illustrative such routine is represented in FIG. 11.

The specific routine listed in FIG. 11 is effective to load the remainder program described above into the memory member 12. The loading routine itself is imprinted on input cards 1 through 12. Card No. 13 of the input stack specifies the address location in the member 12 at which the contents of the next card (No. 14) is to be stored. Cards 14 through 23 have imprinted on them the actual remainder program instructions. Card No. 24 terminates the loading routine. The last three input cards (numbered 25 through 27) are identical to those described above in connection with the execution of the remainder program.

By following the specific procedure represented by FIG. 11 in a step-by-step manner, it can easily be verified that the result thereof is:

(1) To load the remainder program into address locations 20 through 29, and
(2) To execute the noted program for input data having the particular values 013 and 005.

Thus, there has been described herein in detail the structural arrangement and mode of operation of a specific illustrative educational device made in accordance with the principles of the present invention. The described device is relatively fool-proof to manipulate and inexpensive to manufacture, yet is exceptionally well suited for teaching in a visually effective and meaningful way the essential concepts of digital computer operation and programming.

It is to be understood that the above-described arrangements are only illustrative of the application of the principles of the present invention. In accordance with these principles numerous other arrangements may be devised by those skilled in the art without departing from the spirit and scope of the invention. The specific device shown in the drawing may be easily modified in a number of ways to embody therein structural features illustrative of other typical computing and programming techniques. For example, the slider mechanism 70 (FIG. 3) may be arranged to represent not only the sign of the quantity stored in the accumulator 68 but also the occurrence of an overflow condition therein.

What is claimed is:
1. In combination in an educational device,
   memory means for storing a plurality of multidigit numbers at a respective plurality of address locations,
   and control means distinct from and physically removed from said memory means and the number representations stored therein, said control means being adapted to be manually moved into first and second registrations each spaced apart from said storing means,
   said control means including first manually movable means settable for displaying, when said control means is in said first registration, a replica of a designated one of the multidigit numbers stored by said memory means,
   said control means further including second movable means responsive to the setting of said first means and adapted to be physically moved thereby for displaying, when said control means is in said second registration, a decoded version of the designated multidigit number.

2. In combination in an educational device,
   a memory member having spaces thereon at a plurality of designated address locations for storing a plurality of multidigit numbers,
   and a control element adapted to be manually moved by an operator of the device into first and second registrations each spaced apart from said member,
   said element including a plurality of slider mechanisms settable to display, when said element is in said first registration, a particular one of the multidigit numbers stored by said member,
   said slider mechanisms including portions for displaying, when said element is in said second registration, a decoded version of the particular number displayed by said slider mechanisms.

3. A combination as in claim 2, further including manually movable marker means mounted on said memory member for physically referencing and designating a particular address location of said member.

4. In combination in an educational device,
   a memory member having spaces thereon at a plurality of designated address locations for storing a plurality of multidigit numbers,
   a control element adapted to be manually moved by an operator of the device into first and second registrations with respect to said member,
   said element including a set of slider mechanisms settable to display, when said element is in said first registration, a particular one of the multidigit numbers stored by said member,
   said slider mechanisms including portions for displaying, when said element is in said second registration, a decoded version of the particular number displayed by said slider mechanisms,
   marker means for designating a particular one of the multidigit numbers stored by said member,
   said control element being rotatably mounted on a base portion of said device,
   an auxiliary memory member mounted on said base portion for storing a single multidigit number,
   and means mounted on said base portion for holding cards by which information numbers are applied to and abstracted from said device.

5. A combination as in claim 4, wherein said control element includes a slider mechanism that is manually movable in response to a specified order to display a STOP indication.

6. An educational device comprising,
   a base portion having mounted thereon a main memory member for storing multidigit numbers at respectively designated address locations,
   a two-sided control element having one edge thereof said control element further including second indicia means responsive to the setting of said first indicia means for displaying, when said element is in said second position, a decoded version of said designated multidigit number, said base portion and said control element having imprinted thereon flow-lines and orders which precisely guide an operator of the device in moving said marker and in setting said first indicia means, whereby numbers are retrieved from the main memory member, displayed by the first indicia means, decoded by the second indicia means and executed in a systematic step-by-step manner to perform a desired computer operation.

15. In combination in an educational device, memory means for storing a plurality of multidigit numbers at a respective plurality of address locations, and control means distinct from and physically removed from said memory means and the number representations stored therein, said control means being associated with said memory means and adapted to be utilized therewith to display numbers stored in said memory means, said control means including first movable means manually settable for displaying a replica of a designated one of the multidigit numbers stored by said memory means, said control means further including second means movable in response to the manual setting of said first means and adapted to be physically moved thereby for displaying a decoded version of the designated multidigit number.

16. In combination in an educational device, a memory member having spaces thereon at a plurality of designated address locations for storing a plurality of multidigit numbers, and a control element associated with said memory member and adapted to be manually set by an operator of the device to display numbers stored in said memory member, said element including a set of slider mechanisms settable to display a particular one of the multidigit numbers stored by said member, said slider mechanisms including portions for displaying a decoded version of the particular number displayed by said slider mechanisms.

17. An educational device comprising, a base portion having mounted thereon a main memory member for storing multidigit numbers at respectively designated address locations, and a manual movable control element mounted on said base portion in a spaced-apart relationship with respect to said member for displaying a designated one of the numbers stored by said memory member and for displaying in response to the manual setting of said control element to the designated number a decoded version of said designated number.

18. An educational aid which is adapted to provide a step-by-step display indicative of how a general purpose stored program digital computer executes each instruction in a sequence of program instructions and also how each set of program instructions is carried out to cause a desired computer operation to be performed, said aid comprising a base portion having mounted thereon a main memory member on which $n$-digit numbers may be represented at N different address locations, each such number, when interpreted as an instruction, including an operation code portion and an address location portion, a manually movable marker mounted on said memory member for designating a selected one of said address locations, and a control member mounted on said base portion and having first and second sections respectively corresponding to the arrangement of a computer during the instruction time of a complete computing cycle of operation and to the arrangement of the computer during the execution time thereof, said control member including in said first section first manually movable indicia means settable to represent the particular $n$-digit number stored at the selected address location designated by said marker, said control member further including in said second section second indicia means automatically responsive to the manual setting of said first indicia means for displaying the address portion of the $n$-digit number indicated by said first indicia means and a decoded version of the operation code portion of the number indicated by said first indicia means.

19. An educational aid which is adapted to provide a step-by-step display indicative of how a general purpose stored program digital computer executes each instruction in a sequence of program instructions and also how each set of program instructions is carried out to cause a desired computer operation to be performed, said aid comprising a main memory member imprinted with N different address locations at each of which an $n$-digit number may be represented, each such number, when interpreted as an instruction, including an operation code portion and an address location portion, a manually movable marker mounted on said memory member for designating a selected one of said address locations, and a control member including first and second sections respectively positioned in first and second registrations relative to said main memory member, said first section simulating the arrangement of a computer during the instruction time of a complete computing cycle of operation and said second section simulating the arrangement of the computer during the execution time thereof, said control member including in said first section manually movable first indicia means settable to represent the particular $n$-digit number stored at the selected address location designated by said marker, said control member further including in said second section second indicia means automatically responsive to the manual setting of said first indicia means for displaying the address portion of the $n$-digit number indicated by said first indicia means and a decoded version of the operation code portion of the number indicated by said first indicia means.

20. An educational device for teaching the essential fundamentals of digital computer operation and programming, said device comprising a base portion, a main memory member mounted on said base portion, said memory member having a plurality of address location numbers imprinted thereon and further having an area adjacent each such location number for storing a multidigit number, a marker mounted on said main memory member and manually movable by an operator of said device to designate any selected one of said address location numbers, a control element mounted on said base portion in juxtaposed relationship with said main memory member, an auxiliary memory member mounted on said base portion for displaying a single multidigit number, means mounted on said base portion for holding input and output cards, said control element including first indicia means manually settable to display the multidigit number designated by said marker, said control element further including second indicia hingedly secured to said base portion so that said element can be manually moved to display either one of the two sides thereof in a face-up manner, manually movable means on one side of said element for displaying a designated one of the numbers stored by said memory member, and means on the other side of said element automatically movable in response to movement of said manually movable means for displaying a decoded version of said designated number.

7. A device as in claim 6 further including means mounted on said base portion for holding input and output media.

8. A device as in claim 7 still further including an auxiliary memory member mounted on said base portion for storing a single multidigit number.

9. A device as in claim 8 still further including means mounted on said base portion for indicating the sign of the number stored in said auxiliary memory member.

10. An educational device comprising, a base portion having mounted thereon a main memory member for storing multidigit numbers at respectively designated address locations, a two-sided control element having one edge thereof hingedly secured to said base portion so that said element can be manually moved to display either one of the two sides thereof in a face-up manner, means on one side of said element for displaying a designated one of the numbers stored by said memory member, means on the other side of said element for displaying a decoded version of said designated number, means mounted on said base portion for holding input and output media, an auxiliary memory member mounted on said base portion for storing a single multidigit number, means mounted on said base portion for indicating the sign of the number stored in said auxiliary memory member, and means on one side of said control element for moving an imprinted tab member above one edge of said element so that the imprint thereon is visible when the other side of said element is face-up.

11. A device as in claim 10 still further including movable means for designating a single selected address location on said main memory member.

12. An educational aid which is adapted to provide a step-by-step display indicative of how a general purpose stored program digital computer executes each instruction in a sequence of program instructions and also how each set of program instructions is carried out to cause a desired computer operation to be performed, said aid comprising a base portion having mounted thereon a main memory member on which $n$-digit numbers may be represented at N different address locations, each such number, when interpreted as an instruction, including an operation code portion and an address location portion, a manually movable marker mounted on said memory member for designating a selected one of said address locations, and a movable control member mounted on said base portion and adapted to be positioned in first and second registrations relative to said main memory member, said first registration simulating the arrangement of a computer during the instruction time of a complete computing cycle of operation and said second registration simulating the arrangement of the computer during the execution time thereof, said control member including first manually movable indicia means settable, when said control member is in said first registration, to represent the particular $n$-digit number stored at the selected address location designated by said marker, said control member further including second movable indicia means automatically responsive to the manual setting of said first indicia means for displaying, when said control member is in said second registration, the address portion of the $n$-digit number indicated by said first indicia means and a decoded version of the operation code portion of the number indicated by said first indicia means.

13. An educational aid which is adapted to provide a step-by-step display indicative of how a general purpose stored program digital computer executes each instruction in a sequence of program instructions and also how each set of program instructions is carried out to cause a desired computer operation to be performed, said aid comprising a main memory member imprinted with N different address locations at each of which an $n$-digit number may be represented, each such number, when interpreted as an instruction, including an operation code portion and an address location portion, a manually movable marker mounted on said memory member for designating a selected one of said address locations, and a movable control member adapted to be positioned in first and second registrations each spaced apart relative to said main memory member, said first registration simulating the arrangement of a computer during the instruction time of a complete computing cycle of operation and said second registration simulating the arrangement of the computer during the execution time thereof, said control member including first manually movable indicia means settable, when said control member is in said first registration, to represent the particular $n$-digit number stored at the selected address location designated by said marker, said control member further including second indicia means movable in response to the setting of said first indicia means for displaying, when said control member is in said second registration, the address portion of the $n$-digit number indicated by said first indicia means and a decoded version of the operation code portion of the number indicated by said first indicia means.

14. An educational device for teaching the essential fundamentals of digital computer operation and programming, said device comprising a base portion, a main memory member mounted on said base portion, said memory member having a plurality of address location numbers imprinted thereon and further having an area adjacent each such location number for storing a multidigit number, a marker movable to designate any selected one of said address location numbers, a hinge member mounted on said base portion, a control card element having one edge thereof secured to said hinge member so that said control element is manually movable into first and second face-up positions on said base portion, said control element being oriented in juxtaposed relationship with said main memory member when said element is in said first position and being oriented in a spaced relationship with respect to said main memory member when said element is in said second position, an auxiliary memory member mounted on said base portion for displaying a single multidigit number, said auxiliary member being visible only when said control element is in its second position, means mounted on said base portion for holding input and output cards, said control element including first indicia means settable to display, when said element is in said first position, the multidigit number designated by said marker, means automatically responsive to the manual setting of said first indicia means for displaying a decoded version of said designated multidigit number, said base portion and said control element having imprinted thereon flow-lines and orders which precisely guide an operator of the device in moving said marker and in setting said first indicia means, whereby numbers are retrieved from the main memory member, displayed by the first indicia means, decoded by the second indicia means and executed in a systematic step-by-step manner to perform a desired computer operation.

References Cited

UNITED STATES PATENTS

| | | | |
|---|---|---|---|
| 3,144,549 | 8/1964 | Hoberg et al. | 235—157 |
| 3,305,944 | 2/1967 | Albus | 35—30 |

EUGENE R. CAPOZIO, *Primary Examiner.*

W. GRIEB, *Examiner.*